United States Patent [19]

Onodera et al.

[11] 4,284,916
[45] Aug. 18, 1981

[54] ROTARY SIGNAL GENERATOR

[75] Inventors: Keiichi Onodera; Hiroshi Yamaura, both of Kawasaki, Japan

[73] Assignee: Fuji Electric Co. Ltd., Kanagawa, Japan

[21] Appl. No.: 958,558

[22] Filed: Nov. 7, 1978

[30] Foreign Application Priority Data

Nov. 10, 1977 [JP] Japan ............................... 52/135072

[51] Int. Cl.³ .......................................... H02K 11/00
[52] U.S. Cl. .................................. 310/70 R; 310/111; 310/154; 310/168; 123/617; 322/49; 324/174
[58] Field of Search ...................... 310/70 R, 74, 70 A, 310/168–170, 154, 156, 111, 171, 153; 324/174; 123/146.5 A, 148 CB, 148 CC, 148 E, 149 A; 322/49, 50

[56] References Cited

U.S. PATENT DOCUMENTS

| 3,328,614 | 6/1967 | Falge | 310/168 |
| 3,370,190 | 2/1968 | Neapolitakis | 310/168 |
| 3,562,741 | 2/1971 | McEvoy | 324/174 |
| 3,939,416 | 2/1976 | Maskery | 324/174 |
| 4,143,633 | 3/1979 | Peck | 310/168 |

FOREIGN PATENT DOCUMENTS 1831207  7/1969  Fed. Rep. of Germany ........... 324/174

OTHER PUBLICATIONS

"Tachometry in Industry", 11/62; E. K. Elphee.

Primary Examiner—R. Skudy

[57] ABSTRACT

A non-contact signal generator which is adapted for the conduction signal source for the semi-conductor ignition system of so-called current-breaking type or induced-energy accumulating type and which is of the permanent-magnet-energization, variable magnetic reluctance type with one or more than two stationary pole number for generating one conduction signal for each pole in each rotation is disclosed.

4 Claims, 18 Drawing Figures

ROTARY SIGNAL GENERATOR

BACKGROUND OF THE INVENTION

This invention relates to a non-contact rotary signal generator for ON-OFF operation of an ignition system for the internal combustion engine and particularly a semi-conductor ignition system of the type so-called as the current-breaking type or the induced-energy accumulating type.

Generally, the semi-conductor ignition system of the aforementioned type becomes ON mode when the output voltage of the signal generator comes over the predetermined value $V_{on}$ and falls into OFF mode when the output voltage goes down to a value $V_{off}$ which is in a level lower than $V_{on}$. Accordingly, once the ignition system becomes ON mode, it is required that the output voltage of the signal generator is maintained in a level exceeding $V_{off}$ until the commencement of OFF cycle defined by the internal combustion engine.

The principles and structures with disadvantages or inconveniences of the conventional signal generators to be used for the foregoing purpose will be appreciated from the following description prepared with reference to FIGS. 1 to 10 for convenience in understanding.

Figure 1:
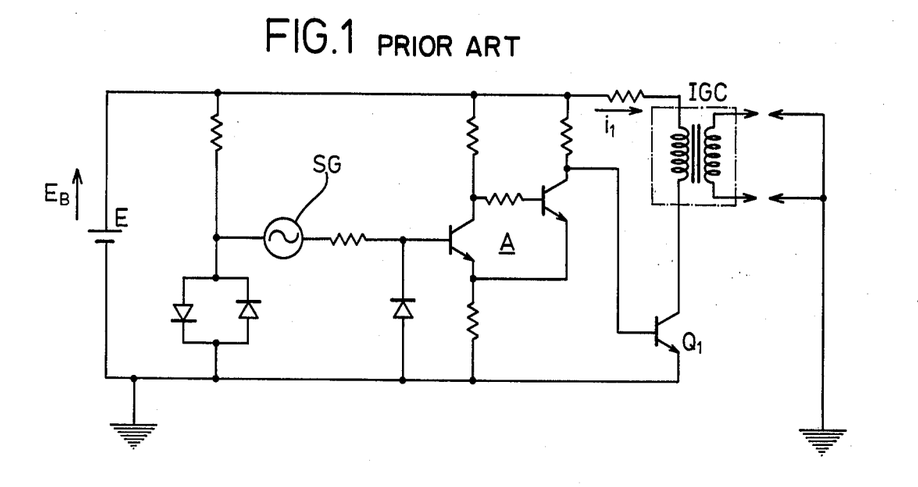
FIG. 1 is a circuit diagram of the typical semi-conductor ignition system of the known type.
Figure 4:
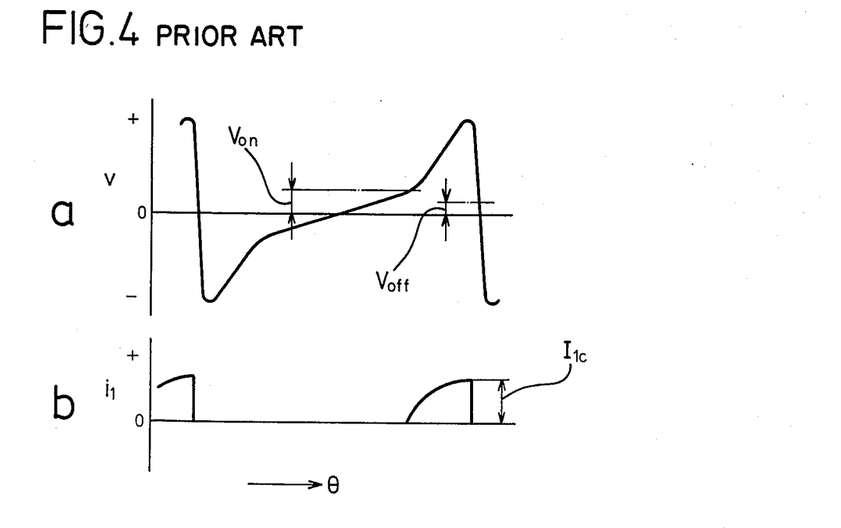
FIG. 4 is a wave form diagram showing the relationship between the output voltage of the non-contact signal generator and the current in the primary winding of the ignition coil.

FIG. 1 shows a circuit diagram of a typical semi-conductor ignition system of the type so-called as the current breaking type or the induced energy accumulating type adapted to a four-cycle, straight two-cylinder type internal combustion engine in which the conventional signal generator is incorporated. This semi-conductor ignition system actuates in association with the output voltage of the non-contact signal generator SG. As shown in FIG. 4a, when the output voltage of the signal generator exceeds the value $V_{on}$, the power transistor $Q_1$ is switched into ON state through the amplifying stage A so as to close the circuit including the battery E, the primary winding of the ignition coil IGC and the power transistor $Q_1$ and consequently the primary current $i_1$ flows, as shown in FIG. 4b, through the closed circuit, the magnitude of which is predominantly defined by the battery voltage $E_B$ and the impedance of the primary circuit of the ignition coil. When the output voltage of the signal generator lowers to $V_{off}$, the power transistor $Q_1$ falls into OFF state to break the current. At the instance when the power transistor is changed into OFF state, the induced energy of $\frac{1}{2}L_1 I^2_{1C}$ is accumulated in the ignition coil, wherein $I_{1C}$ is the primary current of the ignition coil of the instance and $L_1$ is the reactance of the primary winding of the ignition coil. Due to the change of the power transistor $Q_1$ into OFF state, the induced energy is transferred to the secondary winding which has a number of turns generally 100 times more than that of the primary winding, so that an extremely high voltage is generated to discharge across the electrodes of the ignition plug for igniting the fuel-air mixture gas filled in the combustion chamber. The ignition timing is intrinsic to the respective internal combustion engine for a purpose of increasing the fuel efficiency and is required to advance from the instant when the piston reaches the top-dead by a specific value defined by the revolution number per unit time center and the concentration of the mixture-gas.

Figure 2A:
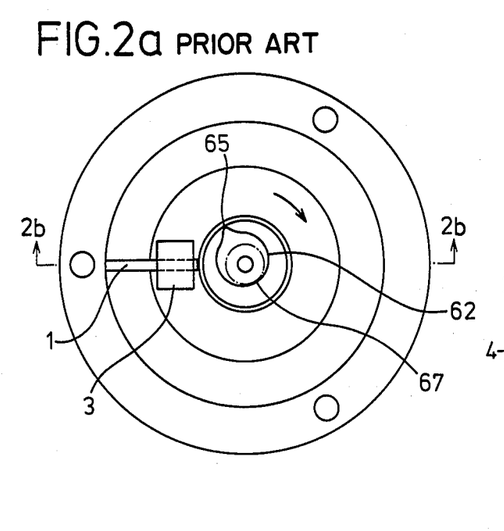
FIG. 2a is a plan view of the known non-contact signal generator.
Figure 2B:
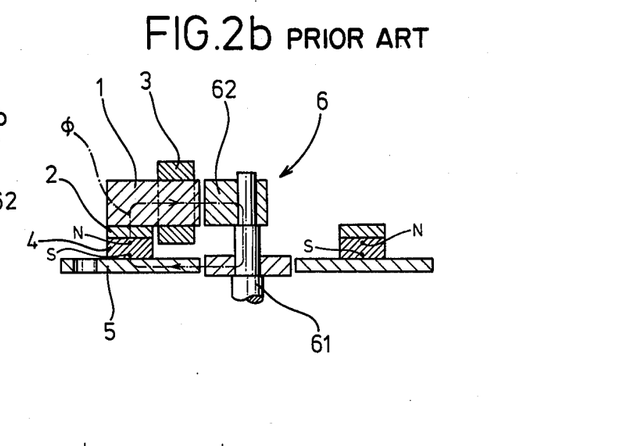
Figure 3:
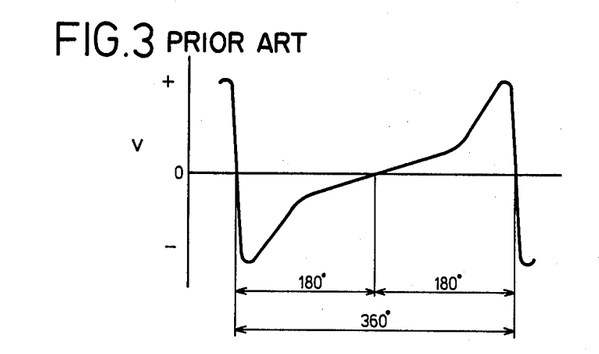
FIG. 3 is a wave form diagram of the output voltage generated in the conventional non-contact signal generator.

FIG. 2 shows the conventional non-contact signal generator of the semi-conductor ignition system which generates a conduction pulse for each revolution of the internal combustion engine, as is required in a four-cycle, straight two-cylinder engine. The non-contact signal generator is of the so-called permanent magnet excitation-variable magnetic reluctance type and includes a stationary portion and a rotary portion. The rotary portion 6 revolves in synchronization with the crank-shaft of the engine. The reference numerals 61 and 62 designate a shaft and a rotary pole, respectively. The stationary portion is essentially comprised of a permanent magnet 4, a connecting member 2, a stationary pole 1, a pick-up coil 3 and a base 5 (or a lower yoke). In this combustion, since a conduction pulse is required for each revolution, a single stationary pole 1 and a single pick-up coil 3 are required and hence the so-called number of pole is one.

Figure 5:
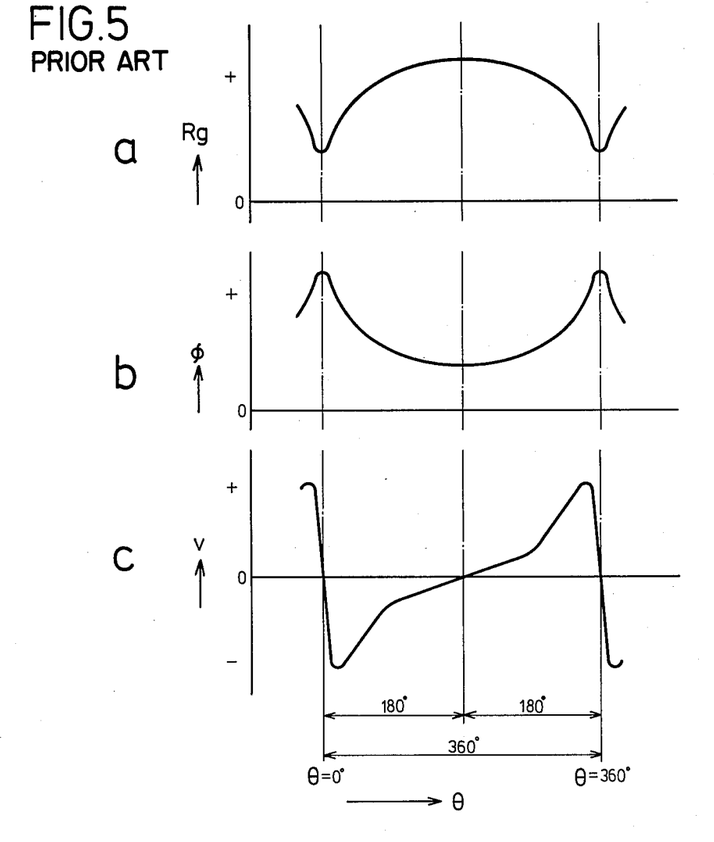
FIG. 5 is a wave form diagram of the magnetic reluctance, the flux and the output.

In the non-contact signal generator, the turning angle $\theta$ is defined as zero when the protruded end 65 of the rotary pole 62 is aligned to the stationary pole 1. At this time, the flux $\phi$ passing through the pick-up coil 3 and defined by the electromotive force of the permanent magnet 4 and the total magnetic reluctance through the magnetic circuit is maximized. In this position, the rotary pole 62 is commenced to turn. For the convenience of explanation, the rotary pole 62 turns clockwise around the shaft when seen from the shaft end to which the rotary pole is mounted. The gap length between the stationary pole 1 and the rotary pole 62 is varied in accordance with the rotation of the rotary pole 62 and the variation of the magnetic reluctance $R_g$ of the gap is illustrated in FIG. 5a. As $R_g$ is predominant in the total reluctance $R_m$ of the magnetic circuit formed by the parmanent magnet, $R_g$ may be considered to represent $R_m$. The flux $\phi$ passing through the pick-up coil 3 is varied with $R_g$ as shown in FIG. 5b.

The electromotive force $v$ produced in the pick-up coil 3 is defined as $(d\phi/dt)=(d\phi/d\theta)\cdot(d\theta/dt)$ and hence represented by the wave form shown in FIG. 5c since the angular velocity $d\theta/dt$ is considered constant. This wave form coincides with the voltage wave form of the non-contact signal generator shown in FIG. 3 and FIG. 4a. Since the minimum radius portion 67 is positioned just opposite to the protruded end as shown in FIG. 2, the gap length or the magnetic reluctance $R_g$ of the gap is maximized when $\theta=180°$ as shown in FIG. 5a. Further, the configuration of the rotary pole is selected so that the magnetic reluctance $R_g$ and the flux $\phi$ passing through the pick-up coil are symmetric when $\theta=0°$ (360° ...) and $\theta=180°$ (540° ...), for which reason the conduction time rate or the ratio of the conduction period of the primary current in the ignition coil to one cycle as shown in FIG. 4b is approximately 50% in case of high speed operation when the ratio between $V_{on}$ and the output voltage of the signal generator is reduced. The conventional system has no defect as far as the pole number is one notwithstanding serious disadvantages are caused in case the pole number is equal to or more than two.

Figure 6:
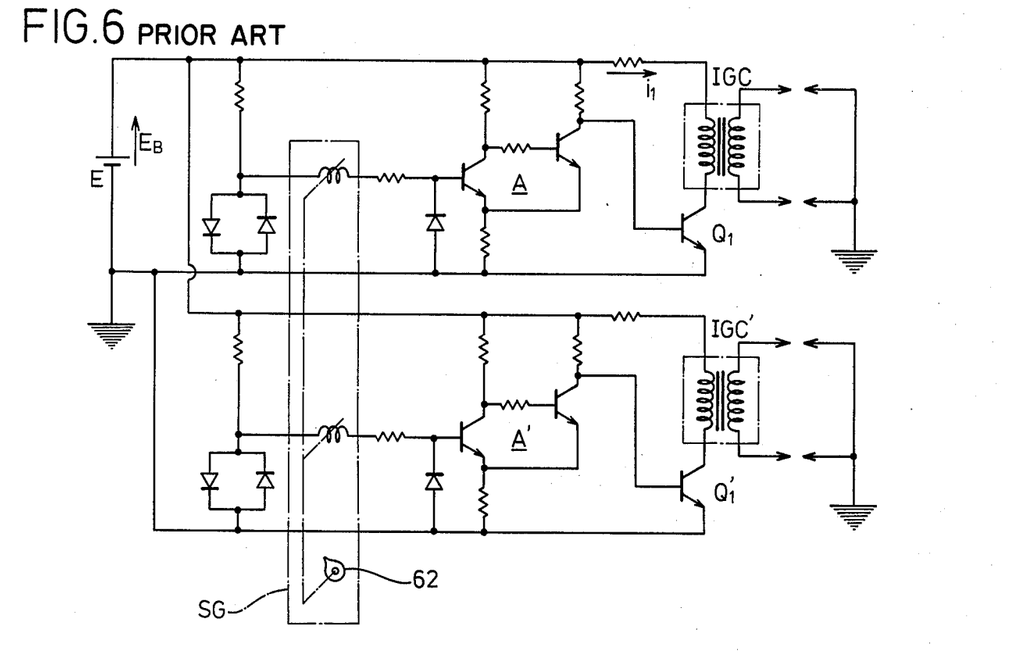
FIG. 6 is a circuit diagram of the conventional semi-conductor ignition system for the engine of a straight four-cylinder type.
Figures 7A, 7B:
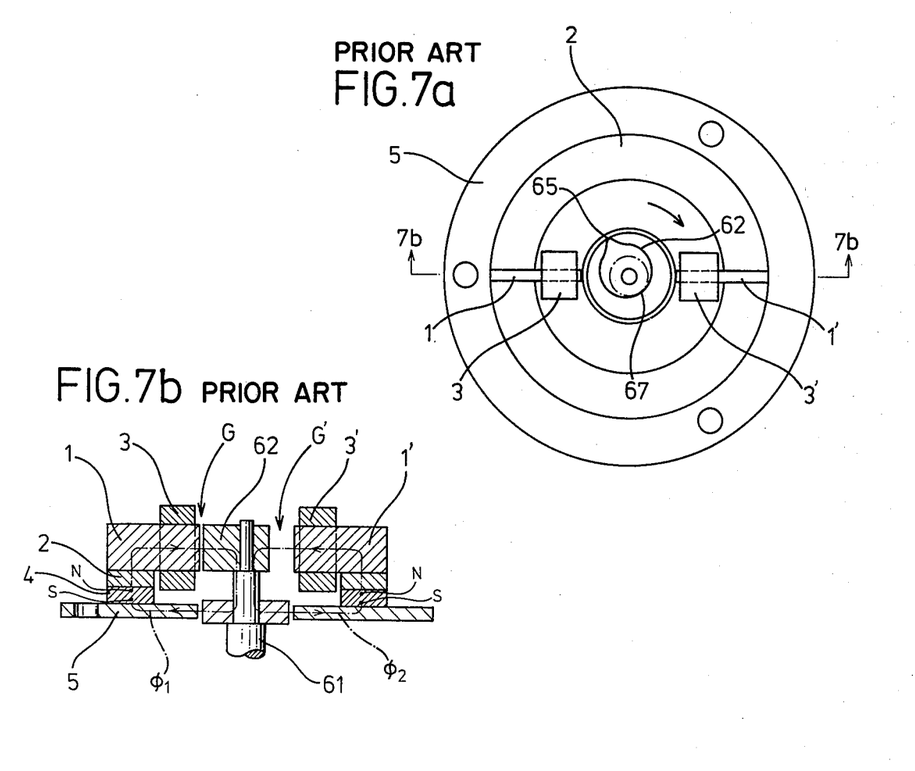
Figure 8:
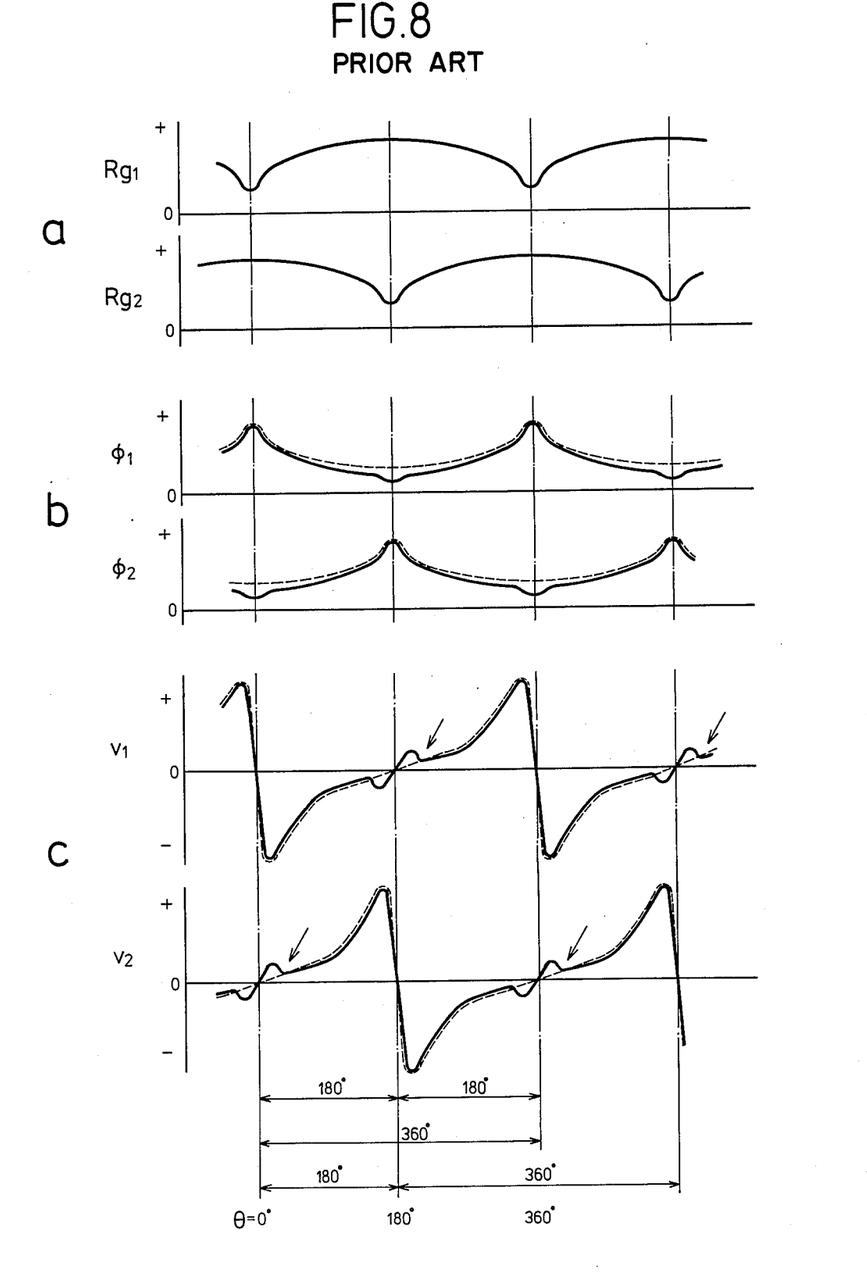
FIG. 8 is a wave form diagram of the magnetic reluctance, the flux and the output generated by the signal generator of FIGS. 7a and 7b.

FIG. 6 shows a circuit diagram of a semi-conductor ignition system of the current-breaking type or the induced energy accumulating type adapted for four-cycle, straight four-cylinder engine. It will be appreciated that the circuit of FIG. 6 includes two sets of the semi-conductor ignition system shown in FIG. 1 and the respective parts of the added set are designated by the primed reference numerals. The semi-conductor ignition system shown in FIG. 6 is controlled by the output voltage of the prior non-contact signal generator shown in FIGS. 7a and 7b. Since two sets of the ignition system are usually required to generate a high voltage alternately in the four-cycle, straight four-cylinder engine, the non-contact signal generator is required to generate an output voltage or responding to such the high voltage. For this purpose, the conventional signal generator includes two sets of the stationary poles with the pick-up coils which alternately produce an ignition signal voltage responding to the rotation of a single rotary pole. Each set of the stationary pole with the pick-up coil works similarly as the signal generator of a single pole shown in FIGS. 2a, 2b and 5. In FIGS. 7a and 7b, each part of the added set corresponding to the similar part of FIGS. 2a and 2b is designated by the primed reference numeral. FIG. 8 illustrates the operation of the conventional ignition system of the permanent magnet excitation-variable magnetic reluctance type with two poles. The turning angle θ is defined as zero when the protruded end of the rotary pole 62 is aligned to the stationary pole 1. At this time, the flux $\phi_1$ passing through the pick-up coil 3 is maximized, the value of which is a little reduced than that of the signal generator with a single pole shown by dotted line in FIG. 8b due to the presence of the stationary pole 1. In accordance with the rotation of the rotary pole 62, the gap length between the stationary pole 1 and the rotary pole 62 is varied and maximized when θ=180°, where the magnetic reluctance $Rg_1$ of the gap G is also maximized as shown in FIG. 8a.

The flux $\phi_1$ passing through the pick-up coil 3 is remarkably reduced than that of a single pole because of two reasons described later. In this position, the protruded end 65 is aligned with the stationary pole 1′ and the magnetic reluctance $Rg_2$ of the gap G′ on the side of the stationary pole 1′ is minimized, which is concerned to the first reason. Seen from the permanent magnet 4, the magnetic circuits 1 and 1′ are parallel. Generally, when a plurality of magnetic reluctances are connected in parallel, the magnetic reluctance for the permanent magnet is governed by one of less value. This phenomenon is clearly shown when θ=180° in FIG. 8a. The second reason is the combination of a plurality of the stationary poles and the single rotary pole. Since the flux of the stationary pole 1′ is maximized in case θ=180° as shown in FIG. 8a, the magnetic potential difference developed in the rotary pole 62 is maximized and thus the flux of the stationary pole 1 is further reduced. As hereinbefore described, the electromotive force generated in the pick-up coil 3 is proportional to $d\phi/d\theta$ by separately considering $d\theta/dt$ as shown in FIG. 8c in which the wave form is rather same as that of the single pole when θ=0° but in the vicinity of θ=180° the curve (solid line) of the two pole is considerably apart from that (broken line) of the single pole. This is caused by the large drop of $\phi_1$ in this area, for which reason a minor wave form is superposed on that of the single pole and dented portions of the electromotive force curve, as indicated by an arrow in the drawing are produced. The superposed minor wave form is called "interference voltage", the presence of which constitutes serious problems in the conventional system.

Figure 9:
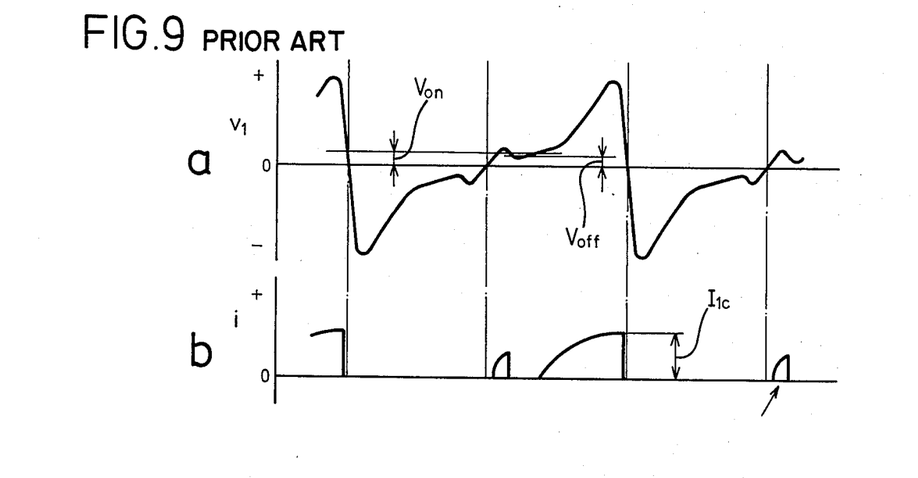
FIG. 9 is a wave form diagram illustrative the relationship between the output voltage and the current in the primary winding of the ignition coil of the non-contact signal generator of FIGS. 7a and 7b.

The stationary pole 1′ shows the same phenomenon delaying in 180° than the pole 1. In the operation of the semi-conductor ignition system including the interference voltage as shown in FIG. 9, the ON period of the power transistor as well as the period when the primary current of the ignition coil flows is twice produced in one cycle, which is followed by twice ignitions in one cycle. Since the first ignition precedes remarkably than the normal second ignition, the abnormal ignition is caused with various disadvantages such as lowering of the combustion efficiency and the generation of knocking.

The signal generator with three poles entails the similar problem except that the interference voltage arises in every 120° of the turning angle θ.

Figures 10A, 10B, 10C:
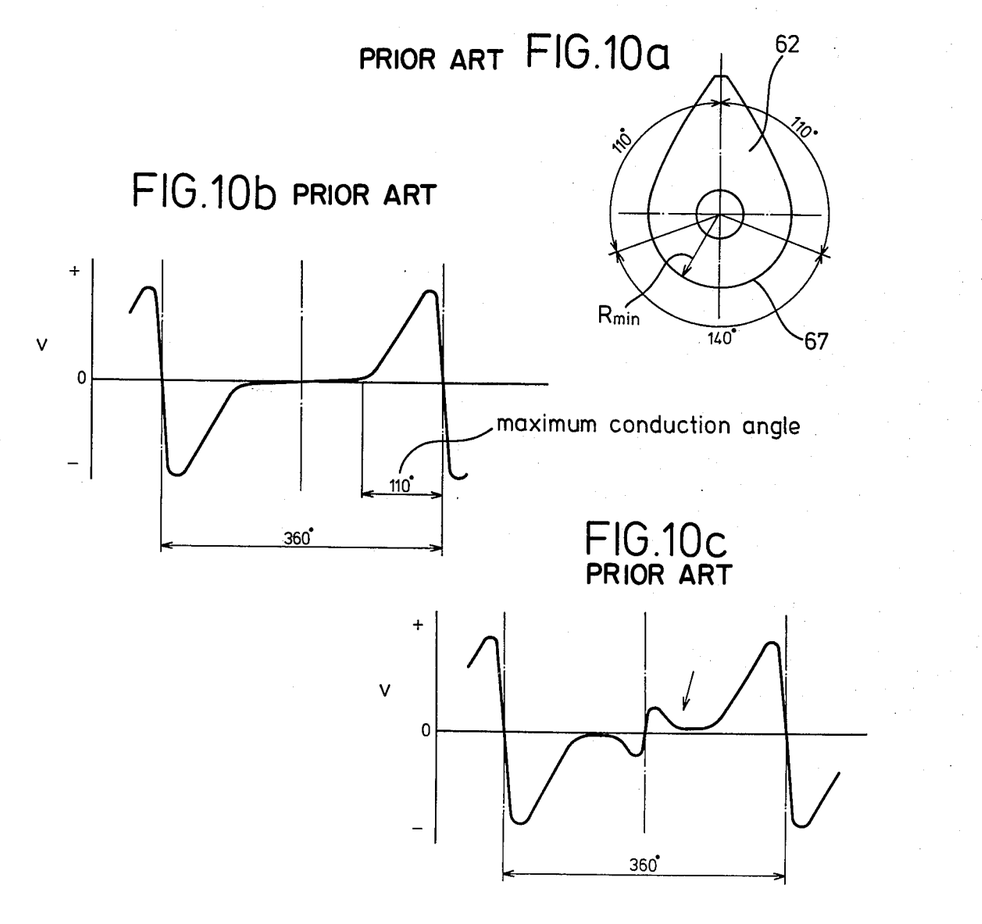
FIG. 10a is a pictorial view of the rotary pole of the non-contact signal generator having a conduction time rate of 30%.
FIG. 10b is a diagram showing the output voltage generated by a combination of the rotary pole of FIG. 10a and a single stationary pole.
FIG. 10c is a diagram of the output voltage generaged by a combination of the rotary pole of FIG. 10a and two stationary poles.

The above-mentioned signal generator of the type as hereinbefore described has a conduction time rate of 50%. Namely, the ratio of the conduction period for the primary current in the ignition coil relative to one cycle is 50%. Since the ignition capacity of the semi-conductor ignition system of the current breaking type or the induced-current accumulating type in the technical field of the invention is represented by the induced energy $\frac{1}{2}L_1 I_{1C}^2$ accumulated in the ignition coil, the conduction time rate may not be 50% as far as the value of $\frac{1}{2}L_1 I_{1C}^2$ is equivalent, for which reason an ignition system with a conduction time rate of less than 50% is employed in the commercial application. An illustration of this is shown in FIGS. 10a, 10b and 10c. Reduction of the conduction time rate is performed by merely varying the shape of the rotary pole with the same stationary portion. An example is illustrated in FIG. 10a. In case of the signal generator with the conduction time rate of 50% (FIGS. 4a and 7a), the minimum radius portion 67 of the rotary pole 62 only presents in a single point just opposite to the protruded end. In FIG. 10a, the minimum radius portion 67 extends in an angular range of 140°. In the region of 140°, the magnetic reluctance Rg of the gap is never varied and hence the output voltage is remained zero or negligible if presents as shown in FIG. 10b. When the interference voltage hereinbefore described is superposed, the curve varies as shown in FIG. 10c in case of the signal generator with two poles. In this case, the following problem is also caused in addition to the double ignitions. Namely, when the value of the dented portion of the output voltage as indicated by an arrow in FIG. 10c comes over a value $V_{off}$ which is caused in a range of the highest speed and its vicinity, the conduction time rate approaches to 50%, which is accompanied by overheating of the ignition coil designed for the conduction time rate of 30%.

SUMMARY OF THE INVENTION

It is, therefore, a general object of the invention to eliminate the foregoing disadvantages and inconveniences and to provide a non-contact signal generator of the permanent magnet energizing and variable magnetic reluctance type which is required to realize the more accurate operation of the semiconductor ignition system of so-called current-breaking type or induced energy accumulating type.

In accordance with the present invention, there is provided a rotary signal generator comprising a rotary magnetic pole which is provided with a protruded end locating in the longest radial distance and with a minimum radius portion locating in the minimum radial distance, and at least two stationary magnetic poles confronted with said rotary pole said protruded end and minimum radius portion being connected with a curved surface and said stationary pole being energized by a permanent magnet and provided with a pick-up coil which generates an output signal when the protruded end of the rotary pole traverses the end of the stationary pole, wherein an angle to be formed by the protruded end and the minimum radius portion in relation to a rotary axis is not more than 120°.

The protruded end is preferably provided with an end face which is formed equidistantly from the rotary axis and also the circumferential length of the end face is defined approximately equal to the width of the confronting stationary pole.

Further, the curved surface connecting the minimum radius portion with the protruded end preferably has a gradually increasing radius of curvature.

A rotary shaft with a rotary pole is inserted into a base plate and an annular magnet is mounted on the base plate concentrically with the rotary shaft and a stationary pole of a predetermined width is arranged on the annular magnet through a yoke member in a confronting relation with the rotary pole and a pick-up coil is mounted on the stationary pole.

Moreover, a plurality of the stationary poles may be arranged equiangularly and circumferentially with a space on the annular magnet through yoke members.

Other objects and advantages of the present invention will be readily apparent and understood from the following description and the accompanying drawings.

BRIEF DESCRIPTION OF THE DRAWINGS

FIG. 2b is a sectional view of the signal generator taken along the line 2b–2b of FIG. 2a;

FIG. 7a is a plan view of the non-contact signal generator adapted in the circuit of FIG. 6;

FIG. 7b is a sectional view of the signal generator taken along the line 7b–7b of FIG. 7a;

FIG. 11a is a plan view of a preferred embodiment of the system according to the present invention;

FIG. 11b is a sectional view of the system taken along the line 11b–11b of FIG. 11a;

DESCRIPTION OF THE PREFERRED EMBODIMENTS

Figures 11A, 11B:
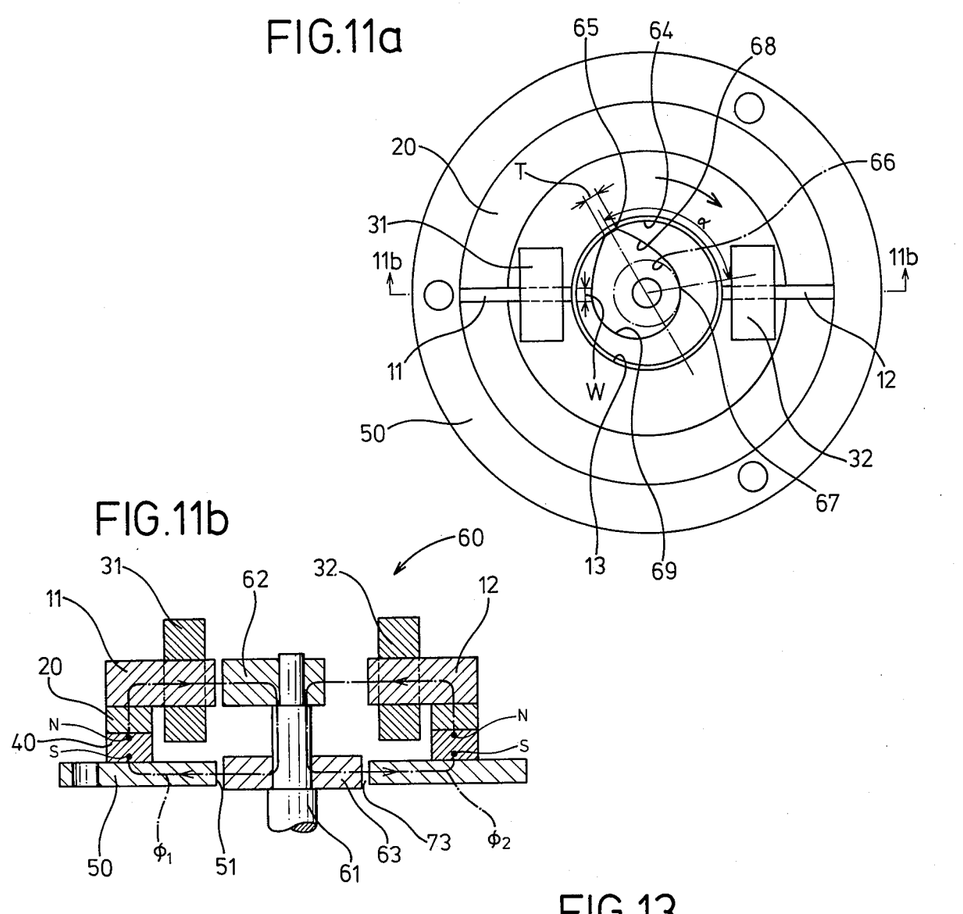
Figure 12:
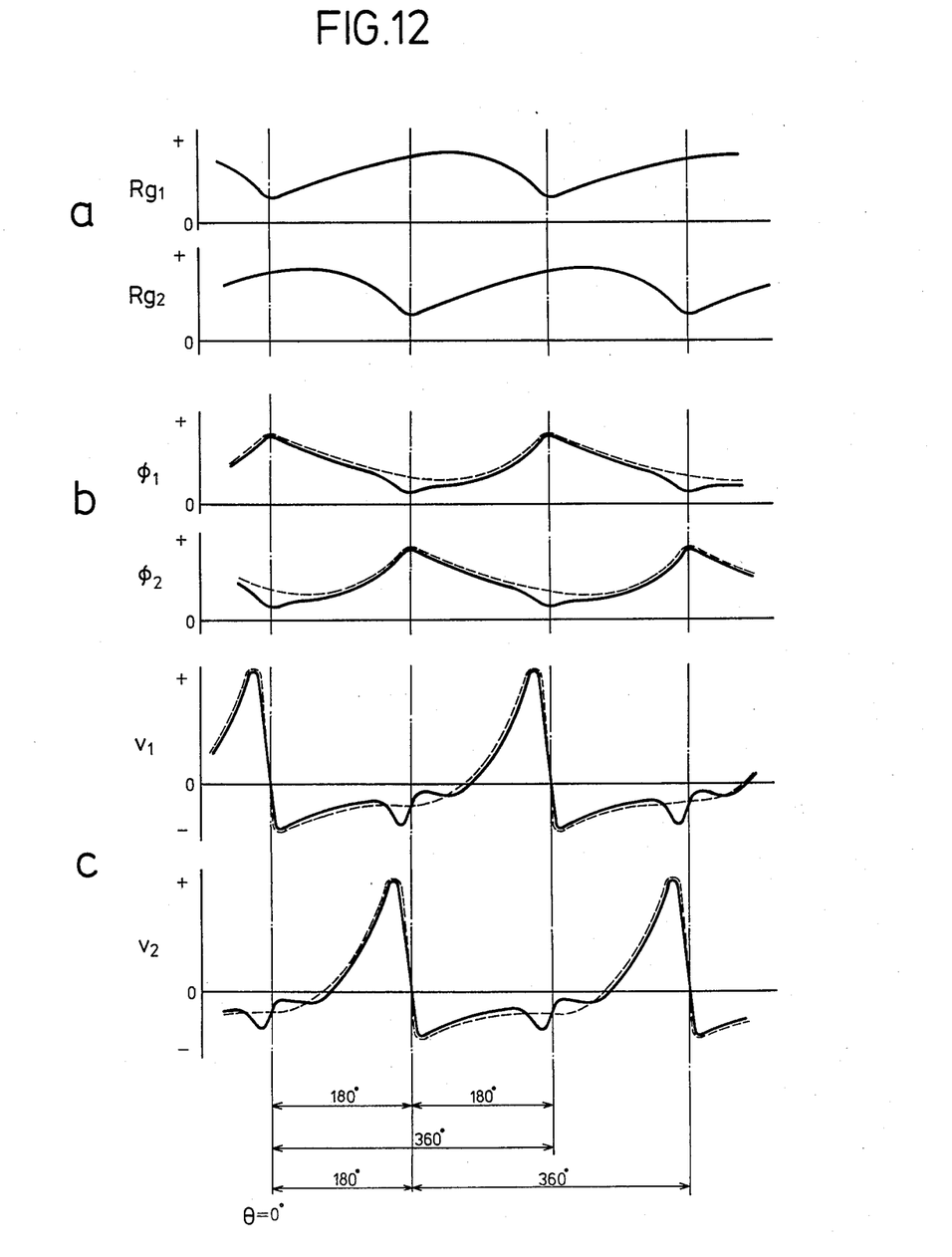
FIG. 12 is a wave form diagram of the magnetic reluctance, the flux and the output generated by the embodiment of FIGS. 11a and 11b.

FIGS. 11a and 12a show an embodiment with two poles according to the invention, in which the stationary poles 11 and 12 are mounted to an annular yoke member 20. To the stationary poles 11 and 12 are secured the pick-up coils 31 and 32 respectively. The yoke member 20 is mounted to one surface of an annular permanent magnet 40 magnetized in the direction of thickness. The opposite surface of the permanent magnet 40 is faced to one surface of the base plate 50 which serves as a lower yoke member. At the center of the base plate 50, a circular opening 51 is provided for passing the rotary member 60 therethrough. The rotary member 60 includes a rotary shaft 61, a rotary pole 62 and a rotary yoke member 63 and the shaft 61 is an extension of the crank shaft of the engine or is constituted to turn in synchronization with the crank shaft. The outer periphery of the yoke member 63 is formed into a circular profile of a diameter with a narrow gap 73 formed between the opening 51. The inner surface of the stationary poles 11 and 12 is arranged to locate on the circle 13 concentric with the opening 51. The rotary pole 62 is of a diameter a little smaller than that of the circle 13 and is provided with a protruded end 65 moving on a circle 64 concentric with the circle 13 and with a minimum radius portion 67 of a smaller diameter than the circle 64 and moving on a circle 66 concentric with the circle 64. The angle $\alpha$ between the protruded end 65 and the minimum radius portion 67 which is equal to the maximum conduction angle of the semi-conductor ignition system is selected at approximately 120° in maximum measured clockwise from the protruded end. The outer surfaces 68 and 69 of the rotary pole 62 between the protruded end 65 and the minimum radius portion 67 are formed of a radius which varies uniformly between the protruded end and the minimum radius end. The width T of the protruded end 65 of the rotary pole 62 is generally not zero but selected at most in the same dimension as the thickness W of the stationary poles 11 and 12 in order that the electromotive force of the pick-up coils 31 and 32 has a desirable peak value and also that the electromotive force of the pick-up coil 31 has a abrupt drop when the turning angle $\theta = 0°$ (360° . . . ), which is required to gain a stable ignition timing against variation of the revolution number per unit time. Accordingly, the gap length between the stationary poles 11 and 12 and the rotary pole 62 takes the minimum value Lg min when the protruded end 65 comes to the position confronting to the stationary poles 11 or 12 and takes the maximum value Lg max when the minimum radius portion 67 comes to the same position, while when the outer surfaces 68 and 69 between the protruded end and the minimum radius portion comes to the same position, the gap length takes an intermediate value. As the gap length is the predominant factor, the magnetic reluctance $Rg_1$ of the gap between the stationary pole 11 and the rotary pole 62 and the magnetic reluctance $Rg_2$ of the gap between the stationary 12 and the rotary pole 62 are varied in accordance with the rotation of the rotary pole 62 as shown in the diagram of FIG. 12a which merely shows a curve for an embodiment with $\alpha = 110°$. Supposing $\theta = 0°$ when the stationary pole 11 and the protruded end 65 are aligned, $Rg_1$ is minimized when $\theta = 0°$, and maximized when $\theta=360°-\alpha=250°$. Since the magnetic reluctances $R_{g1}$ and $R_{g2}$ of the gap are the major factor of the magnetic reluctance of the magnetic circuit including the stationary poles 11 and 12, the fluxes $\phi_1$ and $\phi_2$ which pass through the stationary poles 11 and 12 and hence through the pick-up coils 31 and 32 are varied as shown by the solid lines in FIG. 12b. In this FIG. 12b, the dotted lines illustrates the curve for an embodiment with a single pole. The value of the flux in case of two poles is reduced, as described with respect to the conventional system, from that of a single pole by an extent of the additional flux variation generated by $\phi_2$. The flux $\phi_1$ is maximized when $\theta=0°$, where the additional flux variation is of less extent since the value of $\phi_2$ is small and hence the value of $\phi_1$ is a little smaller than that of a single pole. When $\theta=180°$, $\phi_1$ of the invention is still decreasing as in the case when $\theta<180°$, as shown clearly by the dotted line representing the case of a single pole. In case of two poles, $\phi_2$ is maximized when $\theta=180°$, so that the additional flux variation becomes greater. However, as one of the characteristics of the invention, the variation of $\phi_2$ which causes an interference to $\phi_1$ is radical while $\theta>180°$ and moderate while $\theta<180°$ and accordingly the additional variation of the flux which directly causes an interference voltage is radical while $\theta>180°$ and moderate while $\theta<180°$. When $\theta=250°$, the flux $\phi_1$ is minimized in case of a single pole, but in case of two poles, is not necessarily minimized due to the presence of the additional flux variation. Another characteristic of the invention lies in that the flux $\phi_1$ is varied radically while $250°<\theta<360°$ than it does while $0°<\theta<250°$. When $\theta=360°$, the flux value returns to the same value as when $\theta=0°$.

The value of the electromotive force $V_1$ induced in the pick-up coil is defined in $(d\phi_1/dt)=(d\phi_1/d\theta)\cdot(d\theta/dt)$ and if the angular velocity $d\theta/dt$ is left out of consideration, the wave form as shown in FIG. 12c is obtained. On account of such the variation of the flux $\phi_1$ that $\phi_1$ is still decreasing when $\theta=180°$ and that the additional flux variation is moderate while $\theta>180°$, $v_1$ is negative when $\theta=180°$ in case of a single pole and the additional flux variation is so moderate while $180°<\theta<250°$ that $v_1$ is less raised in the positive direction. Thus, $v_1$ is at most zero and can not exceed $V_{on}$ of the semiconductor ignition system. Further, the abrupt drop of $v_1$ when $\theta=0°$ ($360°\ldots$) is substantially the same as that of the conventional system and there exists no difference between an embodiment of the invention and the conventional system.

Since the electromotive force is induced in the pick-up coil in the fashion as hereinbefore described, many disadvantageous problems accompanied in the conventional system such as double ignitions and the matter of the conduction time rate exceeding the predetermined value which are usually caused by the interference voltage are completely avoided.

It is quite similar as in the known system that the electromotive force $V_2$ induced in the pick-up coil 32 is delayed in phase by 180° from $V_1$ with the same wave form and value as $V_1$.

Figure 13:
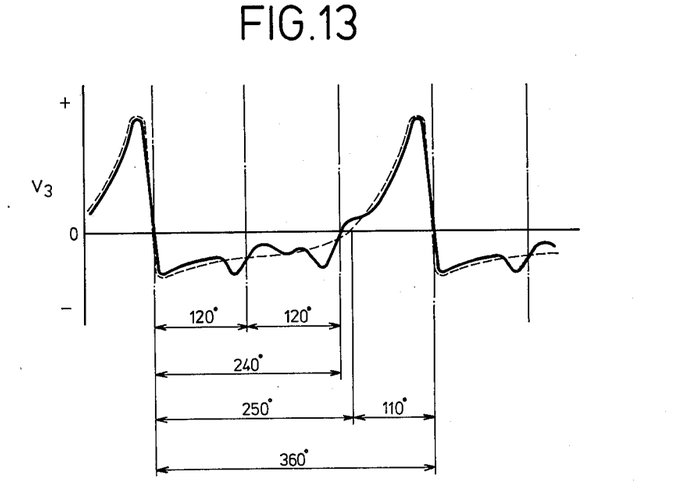
FIG. 13 is an output wave form diagram of the embodiment wherein the pole number is three.

FIG. 13 shows the electromotive force $V_3$ of the pick-up coil of an embodiment with three poles according to the invention. The rotary portion of the embodiment is the same of the embodiment with two poles but the stationary portion is modified into one with three stationary poles and three pick-up coils. In case of three poles, the interference voltage is generated when $\theta=120°$, 240°. The basic electromotive force in case of a single pole shown by a dotted line in the drawing is, when $\theta=120°$, naturally greater in a negative value than that in case of two poles and when $\theta=120°$. Hence, the influence of the interference voltage when $\theta=120°$ in case of three poles has no practical importance. When $\theta=240°$, an interference voltage is induced against $v_3$, but the dented portion, as indicated by an arrow in FIG. 8c, of the electromotive force of the pick-up coil which is generated in the conventional system is no more produced since the inclination of the electromotive force in the vicinity of $\theta=240°$ in case of a single pole is relatively great and also the value of the interference voltage is small while $\theta>240°$. Even if the dented portion developed, the voltage of the dented portion never lowers below the $V_{off}$ level of the semi-conductor ignition system once it exceeds the $V_{on}$ level and hence the drop is negligible.

Accordingly, even in an embodiment with three poles, double ignitions caused by the interference voltage in the conventional system may be perfectly avoided.

According to the invention, the protruded end and the minimum radius portion of the rotary pole in the rotary portion are arranged to provide an angle of approximately or not more than 120°, if represented by the maximum conduction angle which has solved such the problem which is considered unavoidable in the conventional system as the erroneous operation of the semiconductor ignition system caused by the interference voltage induced by the variation in the additional flux which is superposed on the flux of the respective pole by the flux of poles other than the respective one, and hence the accurate operation can be performed under any running condition.

Moreover, the rotary pole of the same structure could be adapted whatever the pole number is, and accordingly common parts are preferably used.

Further, according to the invention, the non-contact signal generator which is adapted for the conduction signal source for the semi-conductor ignition system of so-called current-breaking type or induced-energy accumulating type and which is of the permanent-magnet-energization, variable magnetic reluctance type with one or more than two stationary pole number for generating one conduction signal for each pole in each rotation is so constructed that the protruded end and the minimum radius portion of the rotary pole are arranged in the relative angular location of an angle of approximately or not more than 120°, when represented as the maximum conduction angle, and the gap along the outer periphery of the rotary pole from the protruded end to the minimum radius portion is varied uniformly, thereby to completely eliminate the disadvantages and inconveniences to be caused by the conventional system.

What is claimed is:

1. A rotary signal generator comprising a rotary magnetic pole member which is provided with a single protruded end located at the longest radial distance and with a single minimum radius portion located at the minimum radial distance and a plurality of stationary magnetic pole members uniformly spaced about said rotary magnetic pole member said protruded end and minimum radius portion being connected with a curved surface, each of said stationary magnetic pole members being energized by a permanent magnet and provided with a pick-up coil which generates an output signal when the protruded end of the rotary magnetic pole member traverses the end of the stationary pole, the angle formed by the protruded end and the minimum radius portion in the direction of rotation being not more than 120°.

2. A rotary signal generator according to claim 1, wherein the protruded end is provided with an end face which is formed equidistantly from the rotary axis and the circumferential length of the end face is defined approximately equal to the width of the confronting stationary magnetic pole member.

3. A rotary signal generator according to claims 1 or 2, wherein the curved surface connecting the minimum radius portion with the protruded end has a gradually increasing radius of curvature.

4. A rotary signal generator according to claim 1, wherein the rotary magnetic pole member is mounted on a rotary shaft inserted into a base plate and an annular magnet is mounted on the base plate concentrically with the rotary shaft and the plurality of stationary magnetic pole members, each of a predetermined width, is arranged on the annular magnet through a yoke member in opposition to the rotary magnetic pole member.

* * * * *